3 Sheets—Sheet 1.
W. ROEMER.
FRAME FOR TRAVELING BAGS.
No. 11,278. Reissued Oct. 18, 1892.
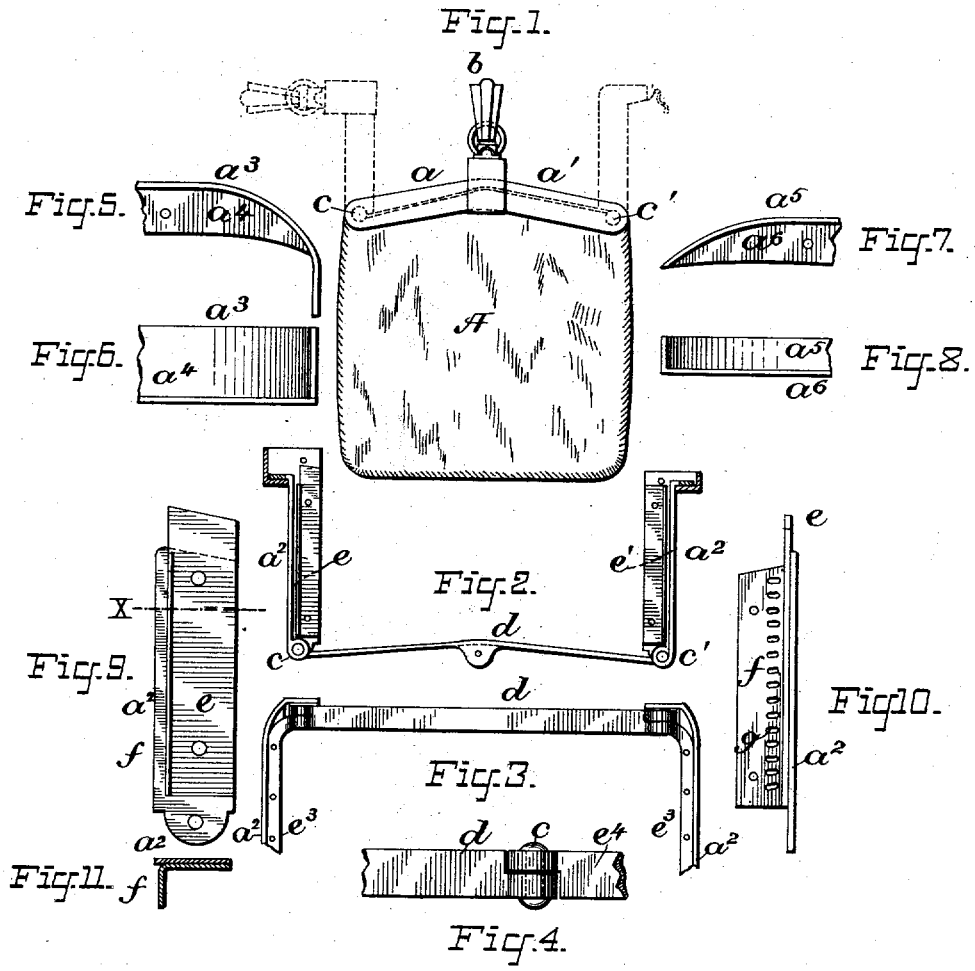
ATTEST:
Henry K. Everding
Fred. Schlesinger
INVENTOR:
William Roemer.
By R. C. Mitchell
Attorney.
THE NORRIS PETERS CO., PHOTO-LITHO., WASHINGTON, D. C.

W. ROEMER.
FRAME FOR TRAVELING BAGS.
No. 11,278. Reissued Oct. 18, 1892.
Fig. 12.
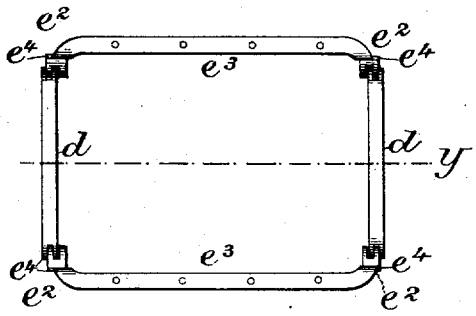
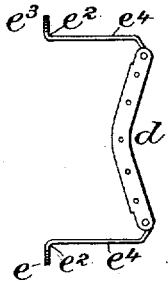
Fig. 14.
Fig. 13.
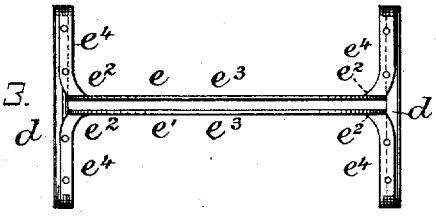
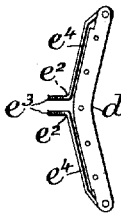
Fig. 15.
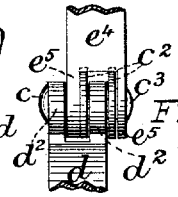
Fig. 16.
Fig. 17.
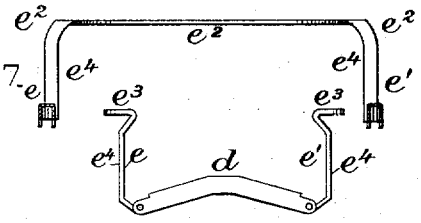
Fig. 18.
ATTEST:
Henry E. Everding
Fred. Schlesinger
INVENTOR:
William Roemer
By R. C. Mitchell
Attorney
THE NORRIS PETERS CO., PHOTO-LITHO., WASHINGTON, D. C.

3 Sheets—Sheet 3.

W. ROEMER.

FRAME FOR TRAVELING BAGS.

No. 11,278. Reissued Oct. 18, 1892.

ATTEST:
Henry E. Everding
Fredk Schlesinger.

INVENTOR:
William Roemer,
By R. C. Mitchell.
Attorney.

THE NORRIS PETERS CO., PHOTO-LITHO., WASHINGTON, D. C.

UNITED STATES PATENT OFFICE.

WILLIAM ROEMER, OF NEWARK, NEW JERSEY.

FRAME FOR TRAVELING-BAGS.

SPECIFICATION forming part of Reissued Letters Patent No. 11,278, dated October 18, 1892.

Original No. 378,620, dated February 28, 1888. Application for reissue filed June 15, 1892. Serial No. 436,863.

*To all whom it may concern:*

Be it known that I, WILLIAM ROEMER, a citizen of the United States, residing at Newark, in the county of Essex and State of New Jersey, have invented certain new and useful Improvements in Frames for Traveling-Bags; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of bags or satchels the frames of which are provided with jaws or sections which are hinged or pivoted to the upper end of the bag at the lateral sides thereof, whereby the said bag may be opened to allow the insertion of articles without disturbing the lower portion or body of said bag, the object being to provide a frame of reduced cost of construction and of greater convenience to the bag-maker and to secure a bag of more finished appearance.

The invention consists in the improved frame for traveling-bags and in the arrangement and construction of parts, substantially as will be hereinafter set forth, and finally embodied in the clauses of the claim.

Figure 23:
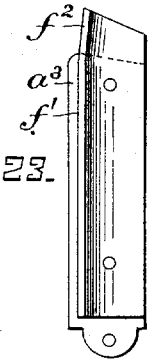
Figure 25:
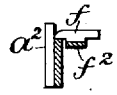
Figure 24:
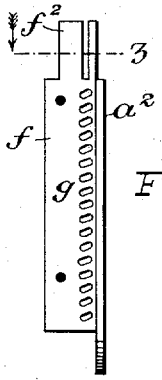

Referring to the accompanying drawings, in which like letters indicate corresponding parts in each of the several figures of the three sheets thereof, Figure 1 is an end elevation of a complete bag embodying my improvement, showing the jaws or sections in a raised position in dotted outline. Fig. 2 is an end elevation and Fig. 3 is a plan of a portion of the jaws or sections with the coverings removed. Fig. 4 is a detail view of the hinge connecting a certain brace or bar for holding the mouth or upper portion of the bag-body open or spread and a portion of the frame portion of the jaw of the bag. Figs. 5, 6, 7, 8, 9, and 10 are enlarged details of certain parts of my invention, which will be hereinafter more fully described. Fig. 11 is a section taken through line $x$ in Fig. 9. Fig. 12 is a plan view, parts being removed to show the jaw-inlays hinged at their ends to a brace or ∩-shaped bar, the said jaw-inlays being opened. Fig. 13 is a plan of the same with the jaw-inlays closed. Figs. 14 and 15 are end elevations, respectively, of Figs. 12 and 13. Fig. 16 is an enlarged detail of a hinge. Fig. 17 is a section taken through $y$, Fig. 12, showing one of the jaw-inlays in interior elevation. Fig. 18 is a modification showing a certain bend in the inlay of the jaws or sections. Figs. 19, 20, 21, and 22 are a side elevation and plan view, alternately, of the outer and inner jaw-frames, showing certain preferred constructions and modifications. Fig. 23 is an end and Fig. 24 is a side elevation of a certain side piece used in connection with the jaw-sections. Fig. 25 is a section taken through line $z$, Fig. 24.

In said drawings, A represents a traveling-bag, of which $a$ and $a'$ are the outer and inner jaws. $b$ is the handle, and $c$ $c'$ are the hinges.

$d$ $d$ are braces or sections which extend across the opposite ends of the bag-body to hold the mouth thereof distended. These are of an inverted-U-shaped form in cross-section, as shown in Fig. 17, to receive the edges of the bag leather or fabric. To the opposite ends of said braces the jaw-inlays $e$ $e'$ are hinged, as at $c$ $c'$, near the upper lateral corners of the bag.

The inlays $e$ $e'$, which are suitably hinged to the end braces or bars for distending the mouth of the bag-body, are made, preferably, of flat or strap-like pieces of metal. These are first bent, as at $e^2$ $e^2$, forming rounded angles therein, where the said inlays lie near or at the ends of the bag, the portions $e^3$ and $e^4$ of the inlays then, after being first bent or formed, lying in the same plane and forming long ⊓-shaped parts. After having been bent thus the said pieces or parts are again bent at or in the "roundings" formed at $e^2$ $e^2$, so that the portions $e^3$ lie in planes at right angles to the planes of the parts marked $e^4$, as shown in Figs. 14 and 15, projecting above said parts $e^4$ but little, if any, more than the width of said parts or portions $e^3$. When the inlays thus twice bent or formed are placed in the bag in connection with the braces or bars $d$, by means of which they are connected, and are turned on their pivoted bearings down on the said braces or bars $d$ to a position corresponding to the closed position of the bag, the said portion $e^3$ $e^3$ of the opposite inlays lie in parallel planes, as in Figs. 13 and 15, and the lower edges of the said portions $e^3$ $e^3$ lie flush with the horizontal upper portion of the bag-body.

By bending or forming the inlays, as described, when the same are brought into combination with the co-operating sections of the bag-frame and with the leather or body material of the bag a new finish is obtained, the longitudinal portion of the frame only projecting above the upper horizontal portion of the bag-body the width of the frame-sections and the portions $e^4$ of the inlays passing beneath and lying against the under side of the said upper horizontal or jaw portions of the bag-body. A space is formed between the portion $e^4$ of the inlay and the outer sections $a^2$, lying parallel therewith, through which the stitches which unite the body material with the material which covers said outer section $a^2$ may pass.

I prefer the ∩-shaped form of braces or distending-bars $d$, inasmuch as the same gives a finish to the edges of the end portions or gussets of the body material without the aid of additional pieces to act as inlays or the need of covering the said braces with leather to secure a finish. To use the ∩-shaped bar the body leather is passed up between the flanges of the bar and the same are riveted together with said body leather between.

The said sections $e$ $e'$ form the inlay portion of the jaws and are preferably finished by plating or otherwise to secure an ornamental appearance. The edges of the bag-body are fastened thereto, and on the outer side of said body are secured frame-sections $a^2$ $a^3$, which are covered with leather secured thereon by means of cement or otherwise.

The outer section $a^3$ of the outer jaw $a$ laps over the outer sections $a^6$ of the inner jaw $a'$, and said outer section $a^3$, together with the end outer sections $a^2$, is riveted to the inlay and also at their upper ends $a^{10}$ and $f^2$, respectively, to one another, thus forming an overlapping flange, which when the bag is closed covers the inner jaw-sections and the brace $d$, concealing the same and giving finish to the bag. The side pieces of both the outer and inner jaw-sections $a^2$ $a^3$ lap over the sides of the bag when in a closed position, thus entirely concealing the ∩-shaped brace or bar $d$ and giving the bag a more finished appearance.

The hinges may be formed as indicated in Fig. 16, the inlay and the ∩-shaped brace or bar $d$ being provided with suitable eyes $e^5$ and $d^2$, respectively, said eyes being placed alternately and suitable washers $c^2$ inserted, as indicated in said figure, and a rivet or pin $c^3$ passed through corresponding perforations in said eyes and riveted on the outside thereof.

Figure 19:
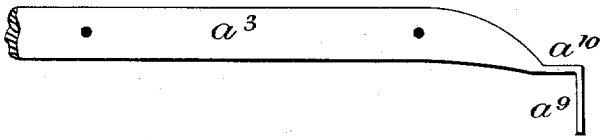
Figure 20:
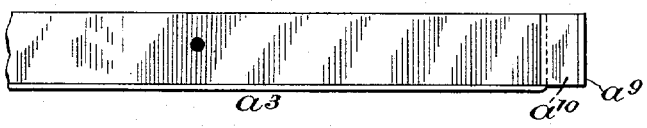
Figure 21:
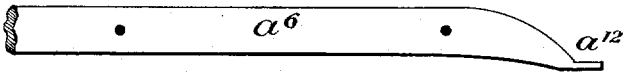
Figure 22:
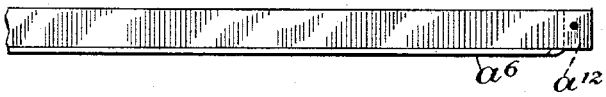

The outer sections $a^2$ may be and preferably are made as shown in Figs. 19 and 20, being provided with a laterally-extending flange $a^{10}$ and then bent at or approximately at right angles, as $a^9$, thus allowing a seat for the tongue $f^2$ of the outer side sections, Figs. 23 and 24, to be riveted thereto, the overhanging flange $a^9$ lapping over said side pieces and thus concealing them and giving a better finish to the bag.

The covering may be stitched through perforations $g$, Fig. 24, if desired, or said covering may be held between the inlay and the outer section when the said sections are riveted thereto, as will be understood.

I do not wish to limit myself to the exact construction of parts herein described and shown, as it is evident that changes may be made in that particular without departing from the spirit or scope of my invention.

Having thus described my invention, what I claim as new is—

1. In a bag-frame, distending braces or bars ∩-shaped in cross-section, inlays hinged at the ends thereof, and outer sections riveted to said inlays, all parts being combined and arranged substantially as set forth and shown.

2. In a bag-frame, the combination, with the jaw-inlays thereof, of outer sections provided with a flange $a^{10}$, bent at or approximately at right angles to form the flange $a^9$, substantially as and for the purposes herein set forth.

3. In a bag, the combination, with distending bars or braces ∩-shaped in cross-section and outer sections, of inlays hinged at their ends to said bars or braces and bent to form a considerably-elongated ⊓-shaped section, substantially as set forth.

4. In a bag-frame or bag, the combination of distending bars or braces adapted to be attached at the mouth of the bag-body with strap-like inlays consisting of parts $e^3$ $e^4$, of which parts the former $e^3$ are adapted to assume vertical positions in the frame and rest perpendicularly on the distending-bars and the parts $e^4$ closing down upon said distending-bars when the bag is closed, and with outer sections riveted to said parts $e^3$ $e^4$, of which outer sections those riveted to said parts $e^4$ are adapted to secure the body material of the bag to said inlay part $e^4$, so that the said body material will cover the hinges of the frame and will lie flat upon both inlay and outer section and parallel to distending-bars when the bag is closed, substantially as described.

5. In a bag or satchel, the combination, with the jaws $a$ $a'$, of distending-bars ∩- shaped in cross-section, substantially as and for the purposes set forth.

6. In a bag-frame, the combination, with distending-bars and suitable outer sections, of inlays hinged to said distending-bars and bent or formed as at $e^2$ $e^3$ and again bent at said angles to cause the portions $e^3$ of said inlays to lie in planes at or approximately at right angles to the planes of the portions $e^4$ thereof, substantially as and for the purposes set forth.

In testimony that I claim the foregoing I have hereunto set my hand this 7th day of June, 1892.

WILLIAM ROEMER.

Witnesses:
R. C. MITCHELL,
HENRY G. EVERDING.